3,489,595
COATING COMPOSITIONS CONTAINING PERFLUOROHALOCARBON POLYMER, PHOSPHORIC ACID AND ALUMINUM OXIDE, BORON OXIDE OR ALUMINUM PHOSPHATE
James A. Brown, Jr., Philadelphia, Pa., assignor to E. I. du Pont de Nemours and Company, Wilmington, Del., a corporation of Delaware
No Drawing. Filed Dec. 22, 1966, Ser. No. 603,765
Int. Cl. B44d 1/14; C08f 45/22
U.S. Cl. 117—72                                23 Claims

ABSTRACT OF THE DISCLOSURE

A composition for priming a surface to improve the adhesion of a perfluorohalocarbon polymer topcoat. The composition contains 40%–98%, by weight of the total solids, of particulate perfluorohalocarbon polymer, 2%–60%, by weight of the total solids, of a combination of phosphoric acid and $Al_2O_3$ or $B_2O_3$ in an acid/oxide ratio of 3/1 to 12/1, or a combination of phosphoric acid and $AlPO_4$ in an acid/phosphate ratio of 1/1 to 5/1, and a liquid carrier.

BACKGROUND OF THE INVENTION

This invention relates to coating compositions. It is more particularly directed to primer compositions for improving the adhesion of perfluorohalocarbon polymer enamels to various surfaces.

In recent years, use of perfluorohalocarbon polymers as lubricious and durable metal coatings has become widespread. Cookware coated with polytetrafluoroethylene (PTFE), for example, has become especially popular because of its non-stick character. The physical nature of these polymers, however, makes it difficult to bond them strongly to their substrates so that the coatings do not peel away during use. This is especially true with PTFE.

Many compositions designed to improve this adhesion have been advanced. The best compositions so far as I know, especially regarding PTFE, were developed by Osdal and are described in his U.S. Patents 2,562,117 and 2,562,118. These contain PTFE and chromic acid, or PTFE and chromic acid in combination with phosphoric acid. Osdal's compositions give improved adhesion, but care must be taken in handling and using them because chromic acid is corrosive and can cause burns.

SUMMARY OF THE INVENTION

I have found that adhesion of a perfluorohalocarbon polymer coating to its substrate can be improved to about the same degree as with Osdal's compositions, with no chance of burns, if a composition of (a) finely-divided perfluorohalocarbon polymer,
(b) aluminum oxide, boron oxide or aluminum phosphate,
(c) phosphoric acid, and
(d) a liquid carrier is used as a primer composition to coat the metal before the perfluorohalocarbon polymer topcoat is applied.

The aluminum oxide used in my compositions can be $Al_2O_3$, $Al_2O_3 \cdot H_2O$, $Al_2O_3 \cdot 2H_2O$, $Al_2O_3 \cdot 3H_2O$ or mixtures of these. Compositions simplest to prepare contain $Al_2O_3$ in the form of "Baymal"® Colloidal Alumina.[1]

The phosphoric acid used can be hypophosphoric-, orthophosphoric-, metaphosphoric- or pyrophosphoric acid. "Phosphoric acid" also includes those compounds which give $H_3PO_4$ or its hydrates when added to water (such as, for example, anhydrous $H_3PO_4$, phosphoric oxide, phosphoric anhydride, $P_2O_5$ and $P_4O_{10}$) and salts which give phosphate ions when dissolved in water [such as $NaH_2O_4$, $Na_2HPO_4$, $NH_4H_2PO_4$, and $(NH_4)_2HPO_4$]. The compositions can also contain acid soluble phosphates such as $Zn_3(PO_4)_2$ together with an acid such as hydrochloric or sulfuric. Mixtures of these forms can also be used. Compositions giving the best adhesion contain orthophosphoric acid.

My compositions can contain from about 2% through about 60%, by weight of the solids, of the acid and oxide or phosphate taken together. Compositions containing 12–15% give the best adhesion.

The acid and oxide should be present in an acid (expressed as orthophosphoric acid)/oxide (expressed as the monohydrate) weight ratio of 3/1 to 12/1. Better adhesion is gotten with acid/oxide ratios of 6/1 to 9/1. Compositions giving the best adhesion have an acid/oxide ratio of about 7/1. If an acid-phosphate combination is used, the acid/phosphate weight ratio will be 1/1 to 5/1, with the 3/1 ratio giving the best adhesion.

"Perfluorohalocarbon polymer," as it is used here, includes such polymers as PTFE, copolymers of tetrafluoroethylene and hexafluoropropylene in all monomer unit ratios, and chloro-fluorocarbon polymers such as polymonochlorotrifluoroethylene.

The polymer used in my compositions is particulate. The particles should be small enough to pass through the nozzle of an ordinary spray gun without clogging it and small enough to give the resulting film integrity. Usually the particles should be no larger than about 0.35 micron in the longest dimension.

Although a dry flour or powder of perfluorohalocarbon polymer can be used to prepare my compositions, the polymer will usually be in the form of an aqueous dispersion because it is most easily obtained on the market in that state. This dispersion, however, can also be based on an organic liquid. The liquids in either case also serve as carriers for my compositions.

The perfluorohalocarbon polymer content of my compositions will vary with need, but will ordinarily be from about 40% through about 98%, by weight of the total solids. Compositions giving the best adhesion contain about 73–76%, by weight of the total solids, of polymer.

If the $Al_2O_3$ or $AlPO_4$ used is colloidal, my compositions can be made by first adding either to 85% phosphoric acid, with stirring, and then adding enough water to give a slurry of the general composition:

|  | Percent by wt. |
|---|---|
| $Al_2O_3$ or $B_2O_3$ | 3–4 |
| $H_3PO_4$ | 20–25 |
| Water | 60–80 |

But if the alumina is coarser than colloidal, it should be dispersed in the phosphoric acid and the dispersion then heated to incipient boiling until a clear solution results. This gives a viscous reaction product which can be diluted with water to give a solution of the same composition as just mentioned.

If aluminum phosphate is used, it is dissolved in 85% phosphoric acid and water added to give a solution of the composition:

|  | Percent |
|---|---|
| $AlPO_4$ | 5–10 |
| $H_3PO_4$ | 20–25 |
| Water | 60–85 |

A dispersion, preferably aqueous, containing about 40–45% by weight of particulate perfluorohalocarbon polymer is then prepared. To this dispersion can be added such surface active agents and other adjuncts as ---
[1] Sold by E. I. du Pont de Nemours and Company.

appear necessary for application properties, and pigments if desired.

About 30–35 parts of the acid/oxide composition or the acid/phosphate composition are then slowly added to about 100 parts of this polymer dispersion, with stirring.

The resulting primer composition should be filtered to remove clumps and can then be conventionally applied. If the surface to be coated is metal, it should be pretreated by grit-blasting or by the flame-spraying of metals or metal oxides such as $Al_2O_3$. This coating is then air dried and baked at a temperature of 450–750° F. for from 10 to 20 minutes.

This primer coat can then be topcoated with a conventional pigmented or unpigmented perfluorohalocarbon polymer composition. The topcoat can then be baked in the usual way to give a tough, durable, adherent polymer coating. Additional coats of a conventional pigmented or unpigmented topcoat composition can be applied over this coating if desired.

Although I get the best coatings with the two-coat system just described, I also get strongly adherent perfluorohalocarbon polymer coatings with a one-coat operation. To do this, I apply a thicker coat of the primer composition, which may contain such pigments and surfactants as are necessary; this coat is then dried and baked as in the two-coat system. The advantages of this one-coat system in terms of labor cost are obvious.

I have also found that I can get perfluorohalocarbon polymer coatings having good adhesion, though not so good as with the systems just described, by spraying the oxide/acid composition on the substrate, baking it, and then applying the polymer topcoat over this.

My compositions will be most useful for coating metal cookware with PTFE, but can also be used to fabricate other articles requiring durable lubricious films permanently bonded to their substrates. These articles can be made of glass or any other material that can withstand the baking temperatures used. For example, my compositions can be used to coat bearings, valves, wire, metal foil, boilers, pipes, ship bottoms, oven liners, iron soleplates, waffle irons, ice-cube trays, snow shovels and plows, chutes, conveyors, dies, tools such as saws, files and drills, hoppers and other industrial containers and molds.

Although the foregoing discloses the use of $Al_2O_3$ or $AlPO_4$ in my compositions, I broadly consider the invention to embrace the use of any aluminum compound which gives aluminum ions in acid solution.

DESCRIPTION OF THE PREFERRED EMBODIMENTS

Example 1

A primer composition is prepared by first slurrying 1.1 parts of "Baymal" ® Colloidal Alumina in 8.7 parts of 85% orthophosphoric acid. To this slurry are then added, with stirring, 22.2 parts of water.

A PTFE dispersion is then prepared by mixing together:

| | Parts |
|---|---|
| PTFE dispersion, 60% solids in water | 72.19 |
| PTFE dispersion, 35% solids in water | 3.35 |
| Sodium lauryl sulfate, 30% solids in water | 3.34 |
| Pigment, 44.5% solids in water | 16.36 |
| $\quad$ $TiO_2$ _____percent__ 43 | |
| $\quad$ Carbon black _____do____ 1.2 | |
| $\quad$ Water _____do____ 55.8 | |
| Toluene | 4.56 |
| | 100.00 |

This dispersion is stirred and the "Baymal"/phosphoric acid composition is then slowly added to it. When all ingredients are dispersed, the dispersion is filtered through muslin and sprayed on a grit-blasted aluminum frypan to a thickness of about .3 mil (dry). The resulting film is air dried and baked at a temperature of 450° F. for 15 minutes.

Over this primer coat is then sprayed a PTFE enamel having the composition:

| | Percent |
|---|---|
| PTFE dispersion in water, 60% solids, containing 6% "Triton" X–100 [1] | 42.91 |
| PTFE dispersion in water, 60% solids, containing 3% sodium lauryl sulfate | 18.01 |
| PTFE dispersion in water, 35% solids | 1.83 |
| Sodium lauryl sulfate, 30% solids in water | 6.32 |
| Pigment | 11.91 |
| Silicone emulsion | 9.12 |
| Toluene | 9.90 |
| | 100.00 |

[1] An alkylaryl polyether alcohol sold by Rohm and Haas Co.

This enamel is applied to give a thickness of about .8 mil (dry), is air-dried and then baked at a temperature of about 750° F. for about 25 minutes.

Adhesion of the PTFE coating to the frypan is excellent.

Example 2

A PTFE enamel is prepared by mixing together the "Baymal"/phosphoric acid composition of Example 1 with 100 parts of the PTFE enamel of Example 1.

This enamel is filtered through muslin and sprayed on a grit-blasted aluminum frypan to a thickness of about 1 mil (dry), is air-dried and then baked at 450° F. for about 10 minutes, then at 750° F. for 10 minutes.

The resulting PTFE coating is tough and durable. It adheres to the frypan during use, without loosening or peeling.

Equivalent amounts of other forms of phosphoric acid and aluminum oxide can be used instead of those shown in the foregoing examples, with equivalent results.

Example 3

A primer composition is prepared as in Example 1, with $B_2O_3$ substituted for "Baymal" Colloidal Alumina. The composition is applied to a grit-blasted steel snow shovel and topcoated as in Example 1, with similar results.

Example 4

A grit-blasted aluminum frypan is primed as in Example 1 and is then sprayed with an unpigmented PTFE enamel having the composition:

| | Percent |
|---|---|
| PTFE dispersion in water, 35% solids in water containing 3% sodium lauryl sulfate | 42.8 |
| PTFE dispersion in water, 60% solids in water, containing 6% "Triton" X–100 | 38.0 |
| Sodium lauryl sulfate, 30% solids in water | 7.1 |
| Demineralized water | 1.9 |
| Toluene | 10.2 |
| | 100.0 |

This is air dried and then baked at a temperature of 750° F. for about 25 minutes to give a PTFE coating having the same adhesive properties as that in Example 1.

Example 5

To 100 parts of a dispersion having the composition

| | Percent |
|---|---|
| Tetrafluoroethylene/hexafluoropropylene 85/15 copolymer | 51.2 |
| "Triton" X–100 | 3.3 |
| Water | 45.5 |
| | 100.0 | are added 32 parts of the aluminum oxide/phosphoric acid composition of Example 1. This dispersion is stirred, filtered and then sprayed on a grit-blasted aluminum frypan to a thickness of about .8 mil (dry), air dried and baked at a temperature of 750° F. for 15 minutes.

The resulting film adheres well to the frypan.

Example 6

To 40 parts of orthophosphoric acid are added, slowly and with stirring, 5 parts of coarse aluminum oxide. This slurry is heated until it begins to boil slowly; heating is continued until the dispersion becomes a clear solution. This solution is then cooled and 108 parts of water are added.

Thirty-two parts of the resulting viscous solution are then added to 100 parts of the PTFE dispersion of Example 1. This dispersion is stirred, filtered through muslin, and applied to a grit-blasted aluminum frypan as in Example 1.

The PTFE enamel of Example 1 is then sprayed over this primer coat and baked as in Example 1, to give a coating having substantially the same properties as that of Example 1.

Example 7

Twelve parts of aluminum phosphate and 40 parts of orthophosphoric acid are mixed and heated at 240° F. until a clear solution results. 108 parts of water are then added to this solution, with stirring.

Thirty-two parts of this solution are then added to 100 parts of the PTFE dispersion of Example 1 and the dispersion stirred thoroughly. This is then filtered, sprayed to a grit-blasted aluminum frypan to a thickness of about .3 mil (dry), air dried and then baked at 450° F. for 10 minutes.

The pan is then topcoated with the PTFE enamel of Example 1 and baked at 750° F. for 25 minutes to give a coating having substantially the same properties as that of Example 1.

Example 8

The primer composition of Example 1 is sprayed on grit-blasted aluminized steel oven-liner to a thickness of 0.3 mil (dry), air-dried and then baked at 450° F. for 15 minutes. The PTFE enamel of Example 1 is then sprayed over this primer coat to a thickness of 0.5 mil (dry), air-dried and baked at 750° F. for 25 minutes.

The unpigmented PTFE enamel of Example 4 is then sprayed over all this to a thickness of 0.3 mil (dry), air-dried and then baked at 750° F. for 25 minutes to give a PTFE coating having excellent adhesion to the metal.

The claims are:

1. A chrome-free composition comprising
 (a) from about 40% through about 98%, by weight of the total solids, of particulate polytetrafluoroethylene, polymonochlorotrifluoroethylene or a tetrafluoroethylene/hexafluoropropylene copolymer;
 (b) from about 2% through about 60%, by weight of the total solids, of a combination of (1) phosphoric acid and colloidal aluminum oxide or boron oxide, the acid and oxide being present in an acid/oxide weight ratio of from 3:1 to 12:1, or (2) a combination of phosphoric acid and aluminum phosphate, the acid and phosphate being present in an acid/phosphate weight ratio of from 1:1 to 5:1, and
 (c) a liquid carrier.

2. A chrome-free composition comprising
 (a) from about 40% through about 98%, by weight of the total solids, of particulate polytetrafluoroethylene, polymonochlorotrifluoroethylene or a tetrafluoroethylene/hexafluoropropylene copolymer;
 (b) from about 2% through about 60%, by weight of the total solids, of a product obtained by dispersing aluminum oxide, boron oxide or aluminum phosphate in phosphoric acid and then heating the dispersion until a clear solution results, the acid/oxide weight ratio in the dispersion being 3:1 to 12:1 or the acid/phosphate weight ratio in the dispersion being 1:1 to 5:1, and
 (c) a liquid carrier.

3. The composition of claim 1 wherein the polymer in (a) is polytetrafluoroethylene.

4. The composition of claim 2 wherein the polymer in (a) is polytetrafluoroethylene.

5. The composition of claim 3 containing about 73–76%, by weight of the total solids, of polytetrafluoroethylene and 12–15%, by weight of the total solids, of the acid-oxide combination, the acid/oxide ratio being 6:1 to 9:1.

6. The composition of claim 4 containing about 73–76%, by weight of the total solids, of polytetrafluoroethylene and 12–15%, by weight of the total solids, of the acid/oxide combination, the acid/oxide ratio being 6:1 to 9:1.

7. The composition of claim 5 wherein the phosphoric acid is orthophosphoric acid, the aluminum oxide is in the form of colloidal alumina and the liquid carrier is water, the acid/oxide ratio being about 7:1.

8. The composition of claim 6 wherein the phosphoric acid is orthophosphoric acid and the liquid carrier is water, the acid/oxide ratio being about 7:1.

9. A method for improving the adhesion of a polytetrafluoroethylene, monochlorotrifluoroethylene or tetrafluoroethylene/hexafluoropropylene copolymer caoting to its substrate, said method comprising incorporating a chrome free combination of (a) phosphoric acid and (b) aluminum oxide, boron oxide or aluminum phosphate into the composition from which the coating is derived, the acid/oxide ratio in said combination being 3:1 to 12:1 and the acid/phosphate ratio in said combination being 1:1 to 5:1, enough of the combination being added to the composition to constitute from about 2% through about 60% of the total solids of the composition.

10. An article bearing a fused film of the composition of claim 1.

11. An article bearing a fused film of the composition of claim 2.

12. An article bearing a fused film of the composition of claim 3.

13. An article bearing a fused film of the composition of claim 4.

14. An article bearing a fused film of the composition of claim 5.

15. An article bearing a fused film of the composition of claim 6.

16. An article bearing a fused film of the composition of claim 7.

17. An article bearing a fused film of the composition of claim 8.

18. An article bearing a fused film of a composition according to claim 1 as a primer, overlaid with a film comprising polytetrafluoroethylene, polymonochlorotrifluoroethylene or tetrafluoroethylene/hexafluoropropylene copolymer.

19. An article bearing a fused film of a composition according to claim 4 as a primer, overlaid with a film comprising polytetrafluoroethylene.

20. An article bearing a fused film of a composition according to claim 4 as a primer, overlaid with a film comprising polytetrafluoroethylene.

21. The article of claim 19, the polytetrafluoroethylene film being unpigmented.

22. The article of claim 20, the polytetrafluoroethylene film being unpigmented.

23. An article bearing a fused film of a composition according to claim 1 as a primer, this film being overlaid with a pigmented film of polytetrafluoroethylene, polymonochlorotrifluoroethylene or tetrafluoroethylene/hexafluoropropylene copolymer, all overlaid with an unpigmented film of polytetrafluoroethylene, polymonochlorotrifluoroethylene or a tetrafluoroethylene/hexafluoropropylene copolymer.

References Cited
UNITED STATES PATENTS

| | | | |
|---|---|---|---|
| 2,562,118 | 7/1951 | Osdal | 117—132 X |
| 3,202,626 | 8/1965 | Fitzsimmons et al. | 117—132 X |

RALPH S. KENDALL, Primary Examiner

U.S. Cl. X.R.

117—75, 124, 132, 161; 148—6.15; 260—29.6, 41

PO-1050
(5/69)

UNITED STATES PATENT OFFICE
CERTIFICATE OF CORRECTION

Patent No. 3,489,595      Dated January 13, 1970

Inventor(s) James A. Brown, Jr.

It is certified that error appears in the above-identified patent and that said Letters Patent are hereby corrected as shown below:

In claim 19, "claim 4" should read -- claim 3 --.

SIGNED AND
SEALED

JUN 16 1970

(SEAL)
Attest:

Edward M. Fletcher, Jr.
Attesting Officer

WILLIAM E. SCHUYLER, JR.
Commissioner of Patents